July 19, 1966   G. E. EILERMAN   3,261,736
GLASS FIBER TREATMENT
Filed April 3, 1962
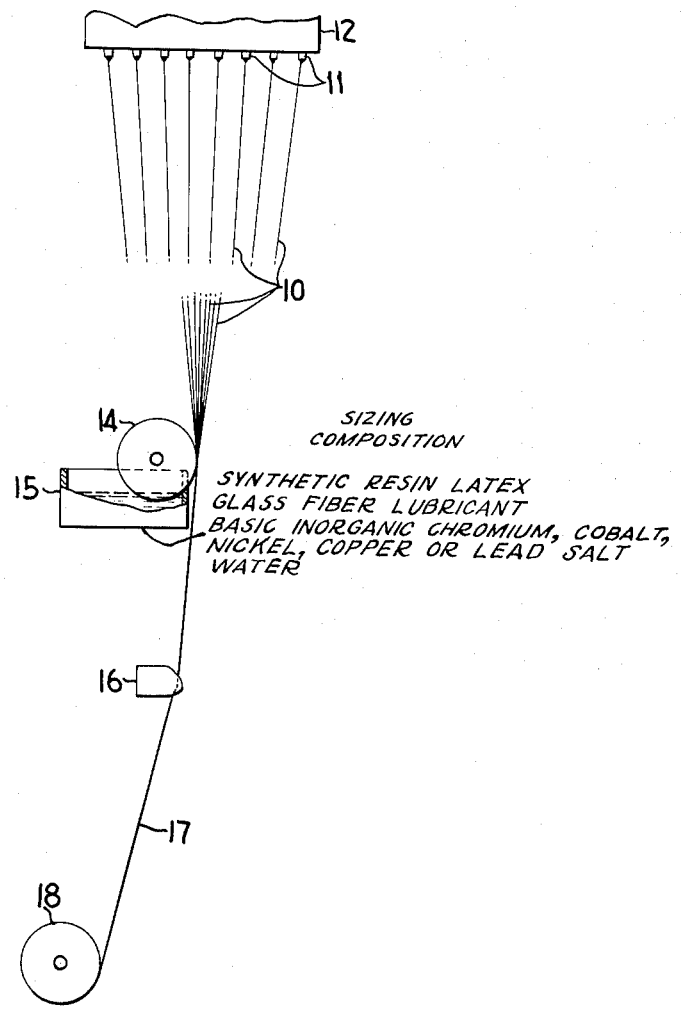
INVENTOR.
GEORGE E. EILERMAN
BY Oscar L. Spencer
ATTORNEY 3,261,736
GLASS FIBER TREATMENT
George E. Eilerman, Pittsburgh, Pa., assignor to Pittsburgh Plate Glass Company, Pittsburgh, Pa., a corporation of Pennsylvania
Filed Apr. 3, 1962, Ser. No. 184,737
7 Claims. (Cl. 156—167)

The present invention relates to a glass fiber treatment and it has particular relation to a size for treating glass fibers which are to be woven into cloth and used as a reinforcement for resins.

A glass fiber strand is composed of a multitude of fine glass filaments which are formed by being drawn at a high rate of speed from molten cones of glass located at the tips of small orifices in a bushing such as shown in U.S. Patent No. 2,133,238. During manufacture, the filaments are coated while moving at a rate of speed of the order of 500 to 20,000 feet per minute with a size which contains a binder to give the strand integrity for workability, i.e., for twisting, plying and weaving. If the strand does not have proper integrity, fuzzing occurs during these operations and eventually the strand may break. The size also contains a lubricant for the filaments to prevent destruction of the strand by abrasion of the individual filaments against each other or against fiber handling equipment.

It is common practice to use glass fiber strands and glass fiber cloth as a reinforcement for resins. For such use, the glass fibers are coated with a coupling agent or finish material which makes the surfaces of the glass fibers hydrophobic and compatible with the particular resins with which they are to be employed. Normally, glass fibers are hydrophilic and resinophobic and a good bond is not obtained between the glass fibers and the resin. The coupling agent serves as a tie-ply between the glass and the resin, and this tie-ply bonds the resin and glass fibers together more strongly than they would be if the tie-ply were not present. It is theorized by some that there is a strong chemical bond between the glass and one atom or group of atoms in the coupling agent, and another strong chemical bond between the resin and another atom or group of atoms in the coupling agent. Thus, the coupling agent serves as a chemical link or couple between the glass and the resin. These coupling agents greatly increase the dry and wet flexural strength of the glass fiber-resin laminates. When glass fibers are used in the form of strands, i.e., roving or chopped strands, for resin reinforcement; the coupling agent is combined with a size and applied with the size to the fibers during their attenuation and forming.

The size conventionally employed in prior art sizing compositions is usually an aqueous dispersion of a film forming, synthetic resin latex, e.g., polyvinyl acetate latex, made by emulsion polymerization of an ethylenic monomer, for example, vinyl acetate. A glass fiber lubricant is generally included in the size. Roving is formed by combining a number of strands in parallel form and winding the strands on a tubular support in a manner such that the combined strands can be unwound and used to form woven roving or chopped strands. It is therefore necessary that the strand to be formed into the roving have good integrity and resistance to fuzzing during the fabrication steps employed to make the roving.

It is highly desirable that a size, which is to be applied to the filaments of the strand during the formation of the strand, be usable in an aqueous solution or dispersion. Organic solvents are unsuitable for they are costly and give off vapors which are harmful to the workers operating the fiber forming process and also create a danger of fire or explosion if they accumulate and contact the hot bushing.

A number of materials have been used in the past as coupling agents in glass fiber sizes. Certain types of organosilicon compounds, such as allyl ethoxy, allylchloro, and vinyl trichloro silanes, have been used as coupling agents to improve the dry and wet strength of glass fiber-resin laminates. However, the use of these silanes is accompanied with many difficulties. They are difficult to prepare and use. In some instances, the silicon derivative is too reactive to use without a preliminary hydrolysis step. Products resulting from this hydrolysis remain in the finish and interfere with the refractive index at the glass interface. Some of the organosilicon compounds require excessively high temperatures to cause "fixation" on the glass fibers. This results in the requirement of special production procedures. Some other silicon derivatives require controlled hydrolysis with consequent lack of stability. Production losses are high when such materials polymerize or precipitate from solution and become unfit for application to the glass fibers.

Another type of coupling agent which has been used in glass fiber sizes is a complex compound of the Werner type in which a trivalent nuclear atom, such as chromium, is coordinated with an organic acid such as methacrylic acid. However, it has been found that the efficacy of such complexes decreases after they have been stored for a period of time, i.e., they do not have good stability characteristics. Furthermore, the wet-out properties of fibers sized with such Werner chromium complexes are not as good after the complex has been stored for a period of time (wet-out being the term used to describe the length of time required for a resin to impregnate (coat) sized glass fiber roving).

It is an object of this invention to provide an improved glass fiber sizing composition containing a coupling agent which can be used readily in an aqueous medium. It is a further object of this invention to provide a sizing composition containing a coupling agent for use in sizing glass fibers for resin reinforcement which can be stored over long periods of time without adversely affecting the wet-out properties of the sized fibers. It is another object of this invention to provide an improved glass fiber sizing composition for use in sizing glass fibers for epoxy resin reinforcement which size imparts better compressive strengths to glass fiber-reinforced epoxy resinous articles than those made from previously known coupling agent sized glass fibers. A further object of this invention is to provide a stable, aqueous glass fiber sizing composition which is both inexpensive and yet possesses great adhesive affinity toward synthetic resins in general, and especially epoxy resins.

These, and other objects, are accomplished by the practice of this invention which, briefly, comprises applying a stable, aqueous size to glass fiber strands during their formation. The size comprises an aqueous dispersion of a synthetic resin latex, a glass fiber lubricant, and a basic (hydroxy containing) metal salt of a strong mineral acid such as a basic chromium chloride, basic chromium sulfate, etc.

The size can be made in large quantity production batches by inexperienced factory workers without fear of spoiling whole batches because of premature agglomeration of the latex. Expensive control equipment is not necessary to make a usable size. The use of the size of the present invention results in better wet-out of the sized glass fibers when subsequently impregnated (coated) with a resin than is accomplished by the use of a size containing a conventional coupling agent such as a chromic chloride complex with an organic acid. In addition, the aqueous sizing composition of the present invention leads to the production of clearer glass fiber-resin laminates when the sized glass fibers are used to reinforce resins, and especially epoxy resins. Moreover, the new size containing a basic metal salt wherein the anion is an anion of strong mineral acid provides better compressive strengths to glass fiber reinforced resinous articles. Furthermore, the basic metal salt as described herein can be stored for long periods of time without deterioration of its properties as a coupling agent in a size for glass fibers. Another important advantage of using the basic metal salts as described herein in a sizing composition is the economic advantage since basic chromium chloride, for example, costs only about one-twelfth as much to prepare as does, for example, methacrylato chromic chloride.

The term "basic metal salts" as used herein is intended to denote: (a) compounds having (1) a trivalent metal ion selected from the group consisting of chromium, cobalt, nickel, copper and lead, (2) at least one hydroxyl group, and (3) at least one anion of a strong mineral acid; (b) coordinate complexes of compounds defined in (a); and (c) mixtures of (a) and (b). Such "basic metal salts" can also be viewed as the "coupling composition" component of the aqueous sizing composition of this invention.

The term "basicity" as used herein is the measure or extent to which hydroxyl groups occupy the three available valences of the trivalent metal ion expressed as a percent. For example, chromium chloride hexahydrate, $CrCl_3 \cdot 6H_2O$ has zero percent basicity. When a hydroxyl group occupies one of the three valences of the trivalent metal ion, e.g., in the basic salts $Cr(OH)Cl_2$ and $CR(OH)Cl_2 \cdot 6H_2O$, these compounds have a basicity of 33⅓ percent. The term "basicity" as used herein does not take into account any water which may be chemically and/or interstitially combined with the coupling agent composition component of the instant sizing compositions.

In order to possess the desired shelf-life, freedom from polymerization, premature agglomeration of the latex, improved wet-out, etc., the "overall basicity" of the coupling component of the aqueous sizing composition of the present invention must be less than 50 percent.

The term "overall basicity" is employed herein to designate the composite basicity of the coupling composition component of the instant sizing composition. When only a single pure basic metal salt is used, the theoretical basicity must be either 33⅓ percent, 66⅔ percent or 100 percent due to the presence of one, two or three hydroxyl groups. However, often, due to convenience, economics and the lack of a necessity to use a single pure compound only, the coupling component will contain a plurality of basic metal salt compounds and/or a plurality of coordinate (electronic) complexes of such compounds and mixtures thereof. The "overall basicity" is determined by analyzing for anion, e.g., chloride, sulfate, etc., in a manner known in the art, and then calclulating for hydroxyl by difference. The overall basicity is then calculated as the percentage of the available (stoichiometric) valence of the trivalent metal ion which is occupied by hydroxyl groups (anions).

Thus, the term "coupling composition" has been used to indicate that the coupling agent can and often does include electron coordinate complexes and mixtures of both compounds and complexes, as well as pure compounds.

The term "strong mineral acids" refers to those inorganic acids such as hydrochloric, hydrobromic, sulfuric, phosphoric, nitric, etc. By "anion" of the strong mineral acid is meant the chloride, bromide or other halide, sulfate, phosphate, nitrate, etc., viz., the negatively charged atom or radical.

While the discussion which follows is largely devoted to basic trivalent metal halides, it should be realized that the invention likewise applies to basic trivalent metal salts containing other anions of strong mineral acids as well.

The basic metal halides can be prepared by methods well known in the art. For example, basic chromium chloride, which is the preferred basic metal halide, can be prepared by reacting a hexavalent chromium compound, such as $CrO_3$ or a hexavalent chromium salt, with a reducing agent in a solution of concentrated hydrochloric acid. The basicity of the product can be controlled by controlling the amount of concentrated HCl in the reaction.

Reducing agents which can be utilized in the preparation of basic chromium chloride from a hexavalent chromium compound include monohydric alcohols such as isopropanol, ethanol, butanol, amyl alcohol, 2-ethoxyethanol and tetrahydrofurfuryl alcohol; polyhydric alcohols such as ethylene glycol, glycerol, glucose, fructose and other mono- and polysaccharides; ketones such as acetone, methyl ethyl ketone, diisobutyl ketone, methyl isobutyl ketone, 2,4-pentanedione, diacetone alcohol, 2,5-hexanedione, ethyl n-butyl ketone, methyl n-propyl ketone, diethyl ketone, methyl t-butyl ketone, di-n-propyl ketone, diisopropyl ketone, diacetyl, mesityl oxide, 1-hexene-5-one, methyl isopropyl ketone, 1-chloro-2-propanone, 1-amino-2-propanone, ethylacetoacetate, ethyl levulinate, acetyl methyl carbinol and hydroxy acetone; carboxylic acids such as formic acid, lactic acid, tartaric acid and maleic acid; aldehydes such as n-butyraldehyde and isovaleraldehyde; amines such as triethanolamine; heterocyclic ketones such as 3-methyl-5-pyrazolone and 1-methyl-2-(1H)-pyridone.

Alternatively, basic chromium chloride can be prepared by reacting chromic chloride hexahydrate ($CrCl_3 \cdot 6H_2O$) and sodium hydroxide or by reacting anhydrous chromyl chloride with a monohydric aliphatic alcohol.

The following examples illustrate methods for the preparation of the basic metal halide. All parts are by weight.

*Example 1*

In 265.5 parts of concentrated hydrochloric acid (specific gravity 1.19) there were dissolved 134.5 parts of $CrO_3$. This solution was added slowly with stirring to a mixture of 378 parts isopropyl alcohol and 22 parts of concentrated hydrochloric acid, the temperature being maintained at 70°–80° C. Subsequently, the resultant mixture was cooled to room temperature. The chloride:chromium atom ratio at this stage was about 1.1:1. Additional concentrated hydrochloric acid was added to adjust the chloride:chromium atom ratio to 2.0:1.0. The final solution of $Cr(OH)Cl_2$ contained 8.21 percent Cr.

*Example 2*

A solution was prepared by adding over a period of 30 minutes with stirring 134.5 parts of $CrO_3$ to 267 parts of concentrated HCl. This solution was added to a previously prepared mixture of 22 parts of concentrated HCl and 671 parts of tetrahydrofuryl alcohol warmed to 70° C. The rate of addition was adjusted so as to maintain the temperature of the resultant mixture within the range of about 70°–100° C. without the necessity for external heating. The total time required for the addition was one hour. After the addition was completed, the resultant reaction mixture, which was a dark green color, had a chlorine content of 6.77 percent and a chromium content of 5.68 percent. The chloride:chromium weight ratio was about 1.10:1.

*Example 3*

To 26.3 parts of powdered $CrO_3$, there were added dropwise over a period of 20 minutes with stirring, 56.20 parts of concentrated HCl. To this mixture, there were then added 144.80 parts of ethyl lactate dropwise, with stirring, over a period of 30 minutes. After the addition of the first few drops of ethyl lactate to the HCl solution of $CrO_3$, the temperature rose spontaneously from 28° C. to 90° C. in about 2 minutes. Thereafter, the reaction mixture was cooled in an ice bath during the addition of the remaining ethyl lactate to maintain the temperature within the range of about 35° C. to 80° C. After the addition of the ethyl lactate was complete, the mixture was stirred for about 16 hours. The final solution which was a dark yellow-green in appearance, had a chloride to chromium weight ratio of about 1.1:1.

Example 4

To 70.5 parts of powered $CrO_3$, there were slowly added over a period of 35 minutes, with stirring, 84.0 parts of concentrated HCl. There were then added to this mixture over a period of 25 minutes 294.3 parts of $CH_3CH_2OCH_2CH_2OH$ (2-ethoxyethanol). During this addition, the reaction mixture was stirred constantly and the temperature was maintained between 60° C. and 80° C. by means of an ice bath. After the addition of 2-ethoxyethanol was complete, the solution was cooled to room temperature and stirring was continued overnight. The final solution was a dark green in color and contained 7.66 percent by weight of chloride and 7.45 percent by weight of chromium. The chloride to chromium weight ratio was 1.05:1.

Example 5

To a solution of 134.5 parts of $CrO_3$ in 287.5 parts of concentrated HCl there were added over a period of 45 minutes 365.5 parts of acetone. The solution was stirred constantly during the addition and the temperature was maintained between 30° C. and 50° C. Subsequently, the reaction mixture was stored overnight. The final reaction mixture was a yellow-brown in color and contained 10.30 percent by weight of chloride and 9.19 percent by weight of chromium. The chloride:chromium weight ratio was about 1.1:1.

Examples 6-10

Table I lists the amounts of $CrO_3$, HCl and reducing agent used in each of these examples as well as the percent by weight content of chloride and chromium in the final solution and the chloride:chromium weight ratio. In each example, a solution of $CrO_3$ in concentrated HCl was first prepared and the reducing agent was slowly added, with stirring, to the solution. The temperature of the reaction mixture during the addition of the reducing agent was maintained below 80° C., by the use of an ice bath, if necessary.

Alternatively, the lubricant can first be mixed with the latex and a solution of basic chromic chloride added to the mixture. For ease of application to the fibers, the size should have a viscosity of less than 100 centipoises at 20° C. The pH of the sizing composition can vary from about 3 to 8 depending on the sensitivity of the latex to precipitate from the dispersion. The more sensitive the latex is to precipitation, the higher the pH of the sizing solution should be. It is desired that the sizing solution have a pH of about 4 to 5 when the latex is polyvinyl acetate.

The latex which is used in combination with a basic metal halide in the size composition is an aqueous dispersion of a synthetic resin, e.g., a synthetic resin made by aqueous emulsion polymerization of ethylenic monomers such as: the various acrylates, which are esters of acrylic or methacrylic acid and an aliphatic alcohol having 1 to 6 carbon atoms including, for example, methyl methacrylate and methyl acrylate; vinyl chloride; styrene; acrylonitrile; chlorovinyl acetate; butadiene; vinylidene chloride; various copolymers of the above monomers, such as butadiene-styrene, butadiene-acrylonitrile, vinyl chloridevinyl acetate copolymers; and like materials which can be employed in latex form in aqueous dispersions as binders for glass fiber strands. These latices generally have an average particle size of 0.1 to 5 microns.

A plasticizer can be used in the size with latices which tend to deposit as a brittle or discontinuous film. For example, a plasticizer can be used with latices of polyvinyl acetate, polyvinyl chloride, the polyacrylates and polystyrene whereas the plasticizer is generally not used with a butadiene-styrene latex. The plasticizer can be any known plasticizer for the various resins, e.g., dibutyl phthalate, tricresyl phosphate, dioctyl phthalate, diisooctyl phthalate and other esters which are conventionally used as plasticizers.

The preferred glass fiber lubricant for use in the present invention is a cationic-active, acid-solubilized, fatty acid amide. This material is manufactured by the Arnold Hoffman Company under the Trade Number 185A. It is an anhydrous material which is a deep reddish, amber,

TABLE I

| Example | Parts $CrO_3$ | Parts Concentrated HCl | Reducing Agent | Parts Reducing Agent | Percent of Chloride in Final Solution | Percent of Chromium in Final Solution | Chloride: Chromium Ratio |
|---|---|---|---|---|---|---|---|
| 6 | 134.5 | 289.0 | Mix of 2- and 3-pentanols. | 550.0 | 9.13 | 8.41 | 1.09:1 |
| 7 | 96.4 | 207.0 | Glycerol | 411.1 | 7.96 | 7.51 | 1.06:1 |
| 8 | 134.5 | 289.0 | 2,4-pentanedione. | 624.6 | 2.44 | 2.10 | 1.16:1 |
| 9 | 134.5 | 289.0 | Diacetone alcohol. | 852.0 | 6.89 | 5.49 | 1.25:1 |
| 10 | 134.5 | 289.0 | 2,5-hexanedione | 712.0 | 7.83 | 5.91 | 1.33:1 |

Example 11

In 1000 parts of water there were dissolved 596 parts of sodium bichromate ($Na_2Cr_2O_3 \cdot 2H_2O$). The solution was heated to about 80° C., and 60 parts of glucose were added at a rate sufficient to prevent gelling or foaming. Subsequently, 60 more parts of glucose and 1566 parts of concentrated HCl (37 percent HCl) were added and the solution was heated to complete the reaction. The solution was spray-dried and the recovered basic chromium chloride was determined to have a basicity of 19.2 percent.

The aqueous glass fiber sizing compositions of this invention can be prepared in stable form by mixing an aqueous solution of the coupling component, such as basic chromium chloride, and an aqueous dispersion of the synthetic resin latex and subsequently adding the glass fiber lubricant. Another method of preparing the size is by premixing basic chromic chloride with a glass fiber lubricant (such as a pelargonic acid amide), allowing this mixture to react, and subsequently adding to the product an aqueous dispersion of the synthetic resin latex.

viscous liquid at room temperature. It is water dispersible and a 1 percent solution has a pH of 8.9 to 9.4. Other commercially available, acid solubilized, fatty acid amides such as stearic amide are useful as glass fiber lubricants in the practice of the invention. These include both saturated and unsaturated fatty acid amides wherein the acid group contains from 4 to 24 carbon atoms. Also included are anhydrous, acid solubilized polymers of the lower molecular weight unsaturated fatty acid amides.

Another glass fiber lubricant which can be used in the size is an alkyl imidazoline derivative which includes compounds of the class u-alkyl N-amidoalkyl imidazolines which can be formed by causing fatty acids to react with polyalkylene polyamines under conditions which produce ring closure. These imidazolines are described more fully in U.S. Patent No. 2,200,815. Other suitable imidazolines are described in U.S. Patents Nos. 2,267,965, 2,268,273, and 2,355,837.

The size can contain a wetting agent. The wetting agent is preferably cationic or non-ionic and it may also serve as an additional lubricant. Any lubricant material can be employed which is conventionally known to be useful as such and will reduce the surface tension of the sizing solution so that it is about 25 to 35 dynes per square centimeter. Such materials include acetyl or stearyl monoamine hydrochloride or acetate, dodecyl amine, hexadecyl amine and secondary and tertiary derivatives of the same, for example, dodecyl methyl amine and salts thereof. Alkyl quaternary ammonium compounds such as trimethyl stearyl or cetyl ammonium bromides and chlorides and generally any of the amine compounds that dissociate in water systems to provide a positive radical containing a group of more than 8 and preferably 12 or more carbon atoms can be used. Other examples of suitable wetting agents are polyoxyethylene derivatives of a sorbital fatty acid ester such as a polyoxyethylene sorbitan monostearate or polyoxyethylene sorbitan trioleate. The amount of such wetting agent employed generally ranges from about 0.01 to 1 percent by weight of the aqueous sizing solution.

The proportions of the various components in the sizing composition are not particularly critical and may be varied widely. The basic metal halide, such as basic chromium chloride usually constitutes from about 0.2% to 1 percent by weight of the sizing composition. Although more than this amount can be used, larger amounts do not materially increase the strength characteristics of the resin laminate. The solids content of the latex may constitute 2 to 8 percent by weight of the aqueous sizing composition with the total solids content of the composition not being more than about 9.5 percent by weight. The amount of the glass fiber lubricant which is present in the sizing solution is about 0.3 to 2 percent by weight.

The sizing composition can be applied to the individual fibers in an aqueous system, i.e., solution and/or dispersion, after their emergence from the bushing and prior to or at the same time they are grouped together to form a strand. As shown in the drawing, in one embodiment the size is applied to the surfaces of the individual filaments 10 just after their emergence from the orifices 11 in electrically heated, platinum alloy bushing 12 by means of a roller applicator 14 (further described in U.S. Patent No. 2,728,972), which is partially immersed in a bath 15 of the sizing composition. Subsequently, the individual filaments 10 are grouped together by means of a graphite guide 16 (further described in U.S. Patent No. 2,373,078) to form the individual strand 17. The strand 17 is then wound on a rapidly rotating forming tube 18. Instead of having the size applied by a roller applicator 14, it can be applied to the filaments 10 at the same time they are grouped together by means of a pad applicator such as shown and described in U.S. Patent No. 2,744,563. Other methods of applying the size can also be employed.

The following example illustrates the formulation of a sizing composition and the use of such composition for sizing glass fibers according to the practice of this invention.

*Example 12*

To 25 kg. of water there were added with stirring 42.22 kg. of a polyvinyl acetate latex containing 55 percent by weight solids and 12.83 kg. of the basic chromium chloride coupling solution prepared in Example 1. Stirring was continued for 5 minues. There was then added a dispersion containing 2.75 kg. of RL–185A (an anhydrous, acid solubilized, low molecular weight, fatty acid amide) in 2.75 kg. of water. Sufficient water was then added to bring the total volume to 250 gallons. The pH of the final size composition was 4.30, the solids content was 3.12 percent by weight and the specific gravity was 1.006.

The above sizing composition was applied to individual filaments of glass after their emergence from the bushing as described previously by means of a roller applicator. The filaments were wound around a forming tube and baked at 270° F. for 8 hours. Subsequently, the treated strands were collected in parallel form to form roving. The roving was impregnated (coated) with a styrenated polyester resin and formed into rods by molding in aluminum tube at 235° F. for 30 minutes. The compressive strengths of the rods were then determined. The styrenated polyester resin is a condensation product of propylene glycol and a mixture of maleic anhydride and phthalic anhydride which condensation product is then thinned with monomeric styrene and heated to cause interpolymerization therewith. An exemplary styrenated polyester resin is sold under the trade name "Selectron 5003L." A small amount of catalyst, e.g., cumene hydroperoxide is included. For the purpose of comparison, the compressive strengths were also determined of rods formed from the same styrenated polyester resin reinforced with glass roving which had been sized in the same manner as above except that an equal amount of methacrylato chromic chloride complex was substituted for the basic chromium chloride. The results are given in Table II.

TABLE II

| Coupling Agent in Size | Percent by Weight of Glass in Glass Reinforced Resinous Article | Compressive Strengths (Pounds per Sq. Inch) | |
|---|---|---|---|
| | | Dry | Wet |
| Basic Chromium Chloride | 48.93 | 56,980 | 29,504 |
| Methacrylato Chromic Chloride Complex | 50.11 | 51,980 | 24,606 |

In preparing the rods, it was noted that the glass strands which had been sized using basic chromium chloride as the coupling agent composition possessed superior wet-out characteristics over the glass strands which had been sized using the methacrylato chromic chloride complex as the coupling agent. Moreover, rods made from glass strands sized using basic chromium chloride were noticeably clearer than those sized, using the methacrylato chromic chloride complex.

*Example 13*

The procedures of Example 12 was repeated except that the sized glass fibers were used to reinforce an epoxy resin to form a glass fiber reinforced, epoxy resinous article. The epoxy resin coating bath contained 100.0 parts by weight of "Epon 828" (viscous epoxy resin), 91.0 parts by weight of "Methyl Nadic Anhydride" (a condensation product of methyl cyclopentadiene and maleic anhydride), and 0.3 percent by weight of N,N-benzyl dimethyl amine, based on epoxy resin.

The roving was dipped for 15 minutes into the epoxy resin bath, and then placed into an aluminum tube and cured in a two stage curing cycle. The first stage of curing was conducted at 250° F. for 16 hours. The second stage of curing (final curing) was accomplished at 300°–350° F. for a period of 4 hours. The rods formed thereby were then tested for compression strength as in Example 12. For the purpose of comparison, the compressive strengths were also determined of rods formed from the same epoxy resin reinforced with glass roving which had been sized in the same manner except using an equal amount of methacrylato chromic chloride complex in place of basic chromic chloride. The results are given in Table III.

TABLE III

| Coupling Agent in Size | Percent by Weight in Glass in Glass Reinforced Resinous Article | Compression Strengths (Pounds per Sq. Inch) | |
|---|---|---|---|
| | | Dry | Percent Retention Wet |
| Basic Chromium Chloride | 64 | 86,213 | 28 |
| Methacrylato Chromic Chloride Complex | 64 | 75,120 | 22 |

The following examples further illustrate the preparation of basic sizing solutions which can be used in the practice of this invention. All parts are by weight.

*Example 14*

To a dispersion of 45.4 parts of an acid solubilized fatty acid amide in 50 parts of water, there were added 239 parts of the solution of basic chromium chloride prepared in Example 5. The mixture was stirred for several minutes and 950 parts of an aqueous dispersion of a butadiene-styrene latex (48 percent by weight solids) were added. Subsequently, sufficient water was added to provide a composition having a viscosity of about 15 centipoises.

*Example 15*

To 844.4 parts of an aqueous dispersion of polyvinyl acetate latex (55 percent by weight solids) there were added 45.4 parts of an anhydrous, acid solubilized fatty acid amide. The mixture was heated to react any free acetic acid in the latex with the amide. Subsequently, there was added a solution of 253 parts of the basic chromium chloride as prepared in Example 11 dissolved in 9000 parts of water. The composition was stirred and suffcient water was added to provide a composition having a viscosity of about 10 centipoises.

Glass filaments which have been coated with the sizing solutions of the invention and wound around a forming tube in the manufacture of the strands are then heated at a sufficient temperature and for a sufficient time to try the sized strands. They are heated at a temperature of 270° F. for eight hours. The treated strands are then collected in parallel form to form roving and the roving is wound on a tube. The roving is then fabricated, e.g., woven into cloth, or chopped into short lengths, i.e., 2 to 5 inches and formed into a mat by means of conventional mat forming techniques.

The sized glass fibers of this invention can be used to reinforce synthetic resins, e.g., to produce molded and laminated articles.

The invention is particularly useful when the sized glass fibers are to be used as reinforcement for low pressure thermosetting resins, for example, unsaturated polyester-ethylenic resins such as shown in U.S. Patent No. 2,676,947 granted to Parker. These resins are interpolymers of (A) a functional polyester of (1) a dihydric alcohol such as ethylene glycol, propylene glycol, 1,3 butylene glycol, diethylene glycol, dipropylene glycol and higher polymers of alkylene glycols, and (2) an alpha, beta ethylenic, dicarboxylic acid such as maleic or fumaric acid with other dicarboxylic acids such as adipic, succinic, azelaic and phthalic acids added and (B) an olefinically unsaturated monomer, soluble in the polyester, and containing a polymerizable olefinic group, such as styrene; vinyl acetate; vinyl toluene; allyl esters, including allyl acetate, allyl succinate, diallyl phthalate, diallyl cyanurate, triallyl cyanurate; dichloro styrene, etc.

The invention is advantageously employed to reinforce epoxy resins, e.g., when the sized glass fibers are to be laminated with polyether or epoxy resins which are condensation polymers of an epihalohydrin and a polyhydroxy phenolic compound and derivatives thereof such as bisphenol A.

While the preceding examples serve to illustrate the present invention in great detail, it should be realized that the present invention is not limited to the specific materials, proportions and conditions specified therein.

Thus, in place of a basic chromium halide coupling composition component, any of the previously defined basic trivalent metal salt of an anion of a strong mineral acid and complexes and/or mixtures thereof can be used, provided that the overall basicity of the coupling composition is less than 50 percent.

Moreover, although the glass fibers sized in accordance with this invention work extremely well as reinforcement for polyester and epoxy resins, it should be realized that the sized fibers can likewise be used with advantage to reinforce a wide variety of synthetic resins, including but not limited to, polystyrene homopolymers and copolymers; vinyl chloride homopolymers and copolymers; polyamide resins, such as the various nylon resins; alkyd resins; phenol-formaldehyde resins; urea-formaldehyde resins, melamine formaldehyde resins and other aminoplast condensates; polysiloxane resins; etc.

The present invention provides an improved, stable aqueous glass fiber textile size which is especially easy to prepare and which is useful for application to fibers which are to serve as reinforcement for synthetic organic resins. The size is stable with respect to both the latex ingredient and the basic chromium halide ingredient contained therein.

I claim:
1. An aqueous glass fiber sizing composition having adhesive compatibility for synthetic resins which composition consists essentially of in percent by weights of water, 0.3 to 2 percent lubricant, 2 to 8 percent synthetic resin latex, and 0.2 to 1 percent of an inorganic coupling composition selected from the group consisting of:
(a) compounds having
  (1) a trivalent metal ion selected from the group consisting of chromium, cobalt, nickel, copper and lead,
  (2) at least one hydroxyl group, and
  (3) at least one anion of a strong mineral acid;
(b) coordinate electronic complexes of compounds defined as in (a); and
(c) mixtures of (a) and (b),
with the proviso that the overall basicity of the coupling composition is less than 50 percent and wherein the viscosity of the sizing composition is less than about 100 centipoises at 20° C.

2. The composition of claim 1 wherein the trivalent metal ion is chromium and the said anion is chloride.

3. A method of treating glass fiber strands during their formation which comprises applying to the strands a stable aqueous sizing composition as described in claim 1 and drying the treated strands.

4. The method of claim 3 wherein the trivalent metal ion is chromium and the said anion is chloride.

5. A glass fiber strand treated according to the method of claim 3.

6. A glass fiber strand treated according to the method of claim 4.

7. In the method of preparing a glass fiber reinforced resinous laminate which method comprises the steps of:
forming glass fiber strands;
applying to the glass fiber strands a stable aqueous sizing composition;
drying the treated strands;
associating the srtnads in suitable form for resin reinforcement;
combining the strands with a resin to produce a glass fiber reinforced resinous laminate;
and curing the resin;
the improvement which comprises using as the aqueous sizing composition the composition described in claim 1.

References Cited by the Examiner

UNITED STATES PATENTS

| | | |
|---|---|---|
| 2,744,835 | 5/1956 | Caroselli. |
| 2,754,223 | 7/1956 | Caroselli. |
| 2,798,020 | 7/1957 | Balz et al. _____ 156—167 |
| 2,799,598 | 7/1957 | Biefeld et al. _____ 156—167 |
| 3,025,588 | 3/1962 | Eilerman. |
| 3,082,183 | 3/1963 | Boyd. |

EARL M. BERGERT, *Primary Examiner.*

D. J. DRUMMOND, *Assistant Examiner.*